United States Patent [19]

Fujii

[11] Patent Number: 4,986,865

[45] Date of Patent: Jan. 22, 1991

[54] METHOD OF PRODUCING TRIM BOARD

[75] Inventor: Masanobu Fujii, Gifu, Japan

[73] Assignee: Ikeda Bussan Co., Ltd, Ayase, Japan

[21] Appl. No.: 437,609

[22] Filed: Nov. 17, 1989

[30] Foreign Application Priority Data

Mar. 22, 1989 [JP] Japan .................................. 1-71057

[51] Int. Cl.⁵ .............................................. B32B 31/18
[52] U.S. Cl. .................................. 156/214; 156/216; 156/226; 156/227; 156/245; 156/267; 156/306.6; 156/313
[58] Field of Search ............... 156/212, 213, 214, 216, 156/226, 227, 245, 253, 267, 306.6, 306.9, 313

[56] References Cited

U.S. PATENT DOCUMENTS

| | | | |
|---|---|---|---|
| 2,466,966 | 4/1949 | Prance et al. | 156/214 |
| 2,616,823 | 11/1952 | Weymouth | 156/313 |
| 3,507,730 | 4/1970 | Gambill et al. | 156/214 |
| 4,328,067 | 5/1982 | Cesand | 156/267 |
| 4,504,347 | 3/1985 | Munic et al. | 156/245 |

Primary Examiner—Caleb Weston
Attorney, Agent, or Firm—Foley & Lardner, Schwartz, Jeffery, Schwaab, Mack, Blumenthal & Evans

[57] ABSTRACT

Disclosed herein is a method of producing a trim board, which comprises by steps: (a) hot-pressing trimming and piercing a resin-impregnated substrate at the same time to produce a shaped substrate; (b) laying an outer skin member onto one surface of the shaped substrate with an interposal of a hot-melt sheet therebetween; (c) pressing the outer skin member against the shaped substrate while the shaped substrate is still hot, thereby to produce a skin covered unfinished trim board; (d) trimming and piercing the outer skin member at portions which correspond to the portions of the shaped substrate at which the trimming and piercing have been carried out at the step (a), the step (d) being so made that a peripheral portion of the outer skin member at which the trimming and piercing have been effected protrudes by a certain degree beyond a peripheral edge of the shaped substrate at which the trimming and piercing have been effected; and (e) turning back the protruding peripheral portion of the outer skin member and fixing the same to a peripheral back portion of the shaped substrate.

6 Claims, 3 Drawing Sheets

METHOD OF PRODUCING TRIM BOARD

BACKGROUND OF THE INVENTION

1. Field of the Invention

The present invention relates to a method of producing a trim board, such as a ceiling trim board, door trim board, rear parcel shelf trim board or the like, of a motor vehicle.

2. Description of the Prior Art

In order to clarify the task of the present invention, one conventional method of producing a ceiling trim board for a motor vehicle will be described with an aid of FIG. 8.

As will be understood from FIG. 8, the ceiling trim board 1 comprises a substrate 2 constructed of a resin-impregnated felt and a facing layer or outer skin member 3 laid on one side of the substrate 2. The substrate 2 has a periphery covered with a peripheral portion 31 of the facing layer 3. The peripheral portion 31 of the facing layer 3 is turned back and fixed to a peripheral back portion of the substrate 2 by means of suitable adhesive or tacking.

In order to produce the ceiling trim board 1, the following producing steps have been hitherto employed.

First, a substrate 2 is hot-pressed to be shaped;

Second, the substrate 2 thus shaped is trimmed and pierced at desired portions;

Third, a suitable adhesive is applied to one surface of the shaped substrate 2;

Fourth, a facing layer 3 is pressed on the adhesive-applied surface of the substrate 2;

Fifth, the facing layer 3 is trimmed and pierced at desired portions; and

Sixth, a peripheral portion of the facing layer 3 is turned back and fixed to the peripheral back portion of the substrate 2 by means of a suitable adhesive or tacking.

However, the first, second and third steps are troublesome and thus require much labor causing increase in production cost of the trim board 1.

SUMMARY OF THE INVENTION

It is therefore an object of the present invention to provide a method for producing a trim board, which method is simple and easy to be carried out.

According to the present invention, there is provided a method of producing a trim board, which comprises by steps: (a) hot-pressing, trimming and piercing a resin-impregnated substrate at the same time to produce a shaped substrate; (b) laying an outer skin member onto one surface of the shaped substrate with an interposal of a hot-melt sheet therebetween; (c) pressing the outer skin member against the shaped substrate while the shaped substrate is still hot, thereby to produce a skin covered unfinished trim board; (d) trimming and piercing the outer skin member at portions which correspond to the portions of the shaped substrate at which the trimming and piercing have been carried out at the stap (a), the step (d) being so made that a peripheral portion of the outer skin member at which the trimming and piercing have been effected protrudes by a certain degree beyond a peripheral edge of the shaped substrate at which the trimming and piercing have been effected; and (e) turning back the protruding peripheral portion of the outer skin member and fixing the same to a peripheral back portion of the shaped substrate.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

In the following, a method according to the present invention will be described with reference to the accompanying drawings. The description will be made with respect to a method for producing, for example, a ceiling trim board for a motor vehicle.

Figure 1:
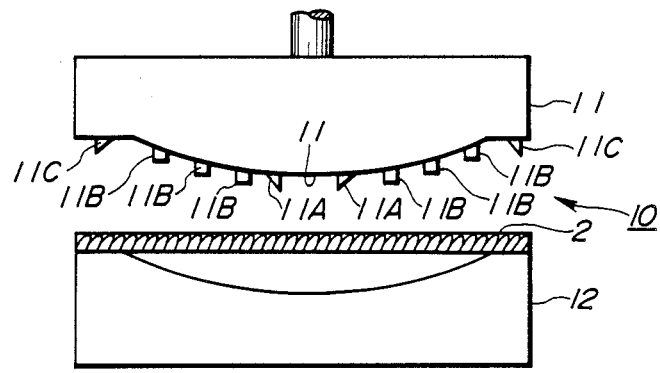
FIG. 1 is a schematically illustrated side view of a hot-press machine which is used for carrying out the present invention, showing a condition wherein a resin-impregnated felt is properly set in the hot-press machine.

As is shown in FIG. 1, a hot-press machine 10 is used for carrying out the method of the present invention. The hot-press machine 10 comprises a male die 11 and a female die 12. Heaters are embedded in both the male and female dies 11 and 12, so that both dies 11 and 12 can be heated to desired temperature. The male die 11 has on its pressing work surface an annular trimming blade 11A, a plurality of piercing pins 11B and a rectangularly extending trimming blade 11C.

In a first step, a resin-impregnated felt 2 is put on the female die 12, as is shown in FIG. 1. The resin-impregnated felt 2 is a felt which has been impregnated with a non-cured or semi-cured phenolic resin which serves as a binder.

Figure 2:
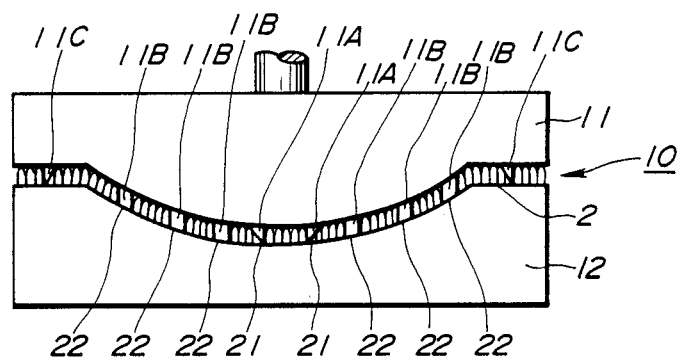
FIG. 2 is a view similar to FIG. 1, but showing a condition wherein the felt is being pressed by the hot-press machine.

As is seen from FIG. 2, the male die 11 is then pressed against the female die 12 having the resin-impregnated felt 2 pressed therebetween. For this hot pressing, the temperature of the two dies 11 and 12 is set at about 170° C. to about 210° C., and the pressure with which the two dies 11 and 12 are pressed is set at about 2 kg/cm$^2$ to about 4 kg/cm$^2$.

Figure 9:
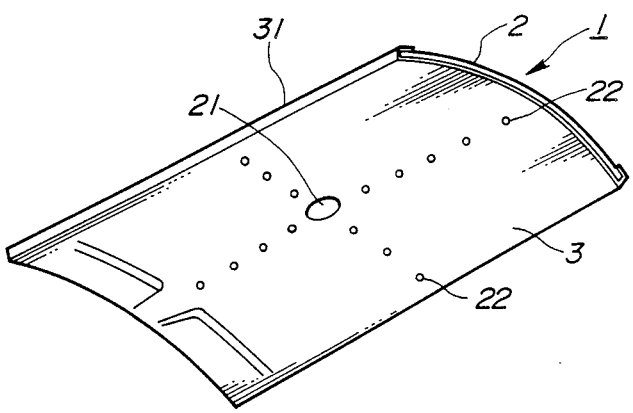
FIG. 9 is a perspective view of a ceiling trim board produced through the method of the present invention.

With this step, the resin-impregnated felt 2 is shaped into a desired curved structure and hardened. Due to provision of the rectangularly extending blade 11C, the felt 2 is shaped rectangular, as may be seen from FIG. 9. Furthermore, due to provision of the annular trimming blade 11A and the piercing pins 11B, trimming and piercing of the felt 2 are simultaneously achieved at the time when the hot pressing is completed. As will be seen from FIG. 9, the felt 2 thus shaped and hardened has a circular opening 21 which is provided by the annular trimming blade 11A and used for mounting a room lamp (not shown) to the ceiling trim board which is to be produced and the felt 2 has further openings 22 which are provided by the piercing pins 11B and used for connecting clips (not shown) through which a reinforcing beam (not shown) is connected to the ceiling trim board.

Figure 3:
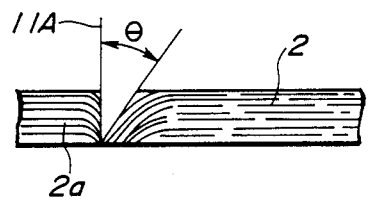
FIG. 3 is a sectional view of the resin-impregnated felt under a condition wherein the same is being pierced.

As is shown in FIG. 3, the annular trimming blade 11A and the rectangularly extending blade 11C on the male die 11 have each a lip angle "$\theta$" of about 40°. This is because upon pressing of the male die 11 against the female die 12, each blade 11A or 11C having such lip angle "$\theta$" forces the fibers of the felt 2 to be collected at a lower portion (as viewed in FIG. 3) of the felt 2 before making the opening 21 and cutting the felt 2. This means that, as is understood from FIG. 3, the opening 21 thus made or the peripheral edge of the felt 2 thus trimmed has a tapered wall, which is advantageous for the reason which will be described hereinafter. It is to be noted that the part denoted by numeral "2a" in FIG. 3 is a part which is to be removed by the blade 11A or 11C.

Figure 4:
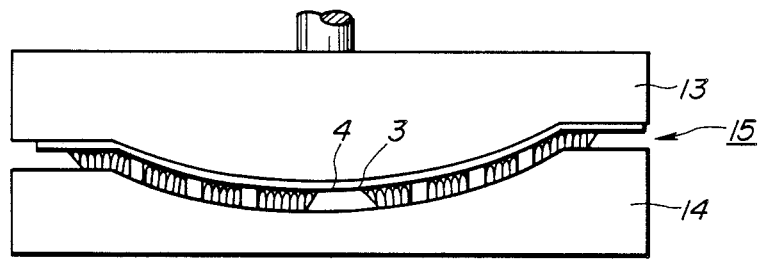
FIG. 4 is a schematically illustrated side view of a pressing machine which is also used in the method of the present invention, showing a condition wherein an outer skin member is being bonded to the felt.
Figure 5:
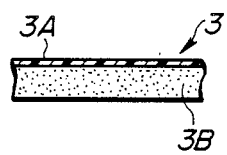
FIG. 5 is a partial sectional view of the outer skin member.

In a second step, as is seen from FIG. 4, the rectangular felt 2 thus shaped and trimmed is set in a pressing machine 15 which comprises male and female dies 13 and 14. Then, during the time when the felt 2 is still hot, an outer skin member 3 having a hot-melt sheet 4 lined thereon is laid on an upper or front surface of the felt 2 and the male die 13 is lowered to achieve bonding between the outer skin member 3 and the shaped felt 2. It is to be noted that the outer skin member 3 has a size somewhat larger than the felt 2, for the reason which will become apparent as the description proceeds. A so-called "skin-covered unfinished trim board" is thus produced. As is seen from FIG. 5, the outer skin member 3 is of a layered member including a PVC (polyvinyl chloride) sheet 3A and a foamed polyurethane sheet 3B.

Figure 6:
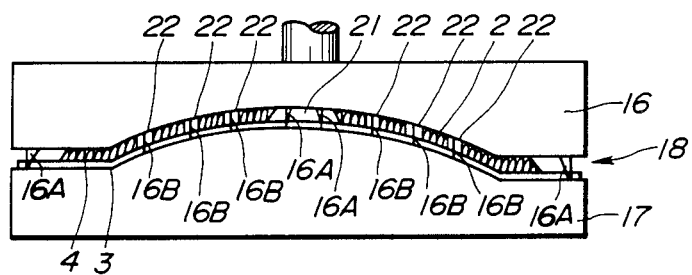
FIG. 6 is a schematically illustrated side view of a trimming and piercing machine which is also used in the method of the present invention, showing a condition wherein the outer skin member on the felt is being trimmed and pierced by the machine.
Figure 7A:
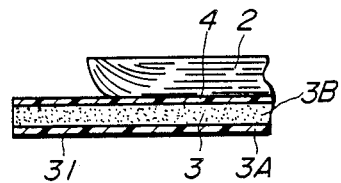
FIG. 7A is a partial sectional view showing a peripheral portion of an unfinished ceiling trim board.
Figure 7B:
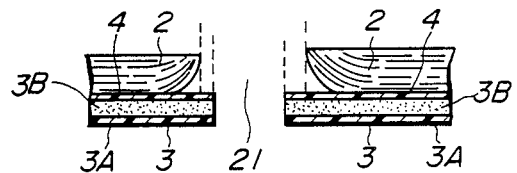
FIG. 7B is a view similar to FIG. 7A, but showing a portion where a room lamp opening is provided.

In a third step, as is seen from FIG. 6, the unfinished trim board is turned upside down and set in a trimming and piercing machine 18 which comprises male and female dies 17 and 18. That is, by using this machine 18, the outer skin member 3 is trimmed and pierced at portions which are exposed to the opening 21 and the openings 22 of the felt 2. For this work, the female die 16 has on its pressing work surface an annular trimming blade 16A, a plurality of piercing pins 16B and a rectangularly extending blade 16C. This work is so made that, as is seen from FIG. 7A, upon completion of the work, the peripheral portion 31 of the outer skin member 3 protrudes outwardly by some extent from the periphery of the felt 2, and, as is seen from FIG. 7B, the opening 21 defined by the outer skin member 3 is formed smaller than the opening 21 defined by the felt 2. Thus, a peripheral portion of the outer skin member 3 by which the opening 21 is defined protrudes inwardly by some extent from a peripheral inclined wall of the felt 2 by which the opening 21 is defined.

Figure 8:
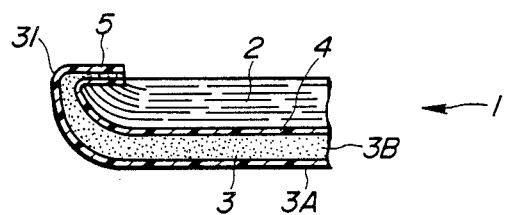
FIG. 8 is a partial sectional view of a finished ceiling trim board showing a peripheral portion thereof.

In a fourth step, as is seen from FIG. 8, the above-mentioned protruding portions of the outer skin member 3 are turned back and fixed to peripheral back portions of the felt 2 by means of tacking 5. If desired, in place of the tacking 5, a suitable adhesive may be used.

It is to be noted that the inclined peripheral edges possessed by the felt 2 can provide the turned back protruding portions of the outer skin member 3 with smoothly curved external appearnce, as is seen from FIG. 8.

As will be understood from the foregoing description, the method of producing the trim board in accordance with the present invention is quite simple as compared with the afore-mentioned conventional method.

In the foregoing description, a felt impregnated with non-cured phenolic resin is used for the substrate for the trim board. However, various materials are usable for the substrate in the present invention, which are, for example, felt, corrugated paperboard and urethane resin which are impregnated with non-cured phenolic resin, melamine resin, urea resin, polyethylene, polypropylene or the like. Furthermore, foamed polyurethane which is impregnated with urethane pre-polymer, isocyanate compound, melamine resin, urea resin or acrylate resin is also usable.

For the outer skin member 3, artificial leather, natural leather, woven fabric, nonwoven fabric, plastic sheet and the like are usable. In addition to them, a layered member including a foamed sheet lined with the above-mentioned outer skin member is also usable.

For the hot-melt sheet 4, polyethylene sheet, polyamide sheet, polyvinylidene sheet and the like are usable in the invention.

What is claimed is:

1. A method of producing a trim board, comprising by steps:
   (a) hot-pressing, trimming and piercing a resin-impregnated substrate at the same time to produce a shaped substrate;
   (b) laying an outer skin member onto one surface of said shaped substrate with an interposal of a hot-melt sheet therebetween;
   (c) pressing said outer skin member against said shaped substrate while the shaped substrate is still hot, thereby to produce a skin covered unfinished trim board;
   (d) trimming and piercing said outer skin member at portions which correspond to the portions of the shaped substrate at which the trimming and piercing have been carried out at the step (a), the step (d) being so made that a peripheral portion of said outer skin member at which said trimming and piercing have been effected protrudes by a certain degree beyond a peripheral edge of said shaped substrate at which said trimming and piercing have been effected; and
   (e) turning back the protruding peripheral portion of said outer skin member and fixing the same to a peripheral back portion of said shaped substrate.

2. A method as claimed in claim 1, in which said resin-impregnated substrate is a felt which is impregnated with a non-cured or semi-cured phenolic resin.

3. A method as claimed in claim 1, in which the peripheral edge of said shaped substrate is inclined with respect to a major surface of said shaped substrate.

4. A method as claimed in claim 1, in which the trimming and piercing of the step (a) are carried out by using cutting blades, each blade having a lip angle of about 40°.

5. A method as claimed in claim 4, in which the fixing of said protruding peripheral portion of said outer skin member to said peripheral back portion at the step (e) is made by using tacking or adhesive.

6. A method as claimed in claim 1, in which said hot-melt sheet is bonded to said outer skin member before the step (b).

* * * * *